United States Patent
Lukac

(10) Patent No.: US 7,238,113 B2
(45) Date of Patent: Jul. 3, 2007

(54) TUBULAR TELESCOPING DRIVE SHAFT

(75) Inventor: J. Bradley Lukac, Chicago, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/525,568

(22) Filed: Sep. 22, 2006

(65) Prior Publication Data

US 2007/0015592 A1    Jan. 18, 2007

Related U.S. Application Data

(62) Division of application No. 10/980,054, filed on Nov. 3, 2004, now Pat. No. 7,207,890.

(51) Int. Cl.
*F16C 3/03* (2006.01)

(52) U.S. Cl. ........................ 464/162; 464/172

(58) Field of Classification Search ................ 56/13.5, 56/13.8, 28, 40, DIG. 4, DIG. 6; 464/162, 464/167, 169, 172; 180/384
See application file for complete search history.

(56) References Cited

U.S. PATENT DOCUMENTS

| | | |
|---|---|---|
| 1,084,912 A | 1/1914 | Trufant |
| 2,524,853 A | 10/1950 | Szekely |
| 2,796,749 A | 6/1957 | Warner |
| 3,543,536 A | 12/1970 | Rekow |
| 4,125,000 A | 11/1978 | Grob |
| 5,697,850 A | 12/1997 | Yaegashi et al. |
| 5,951,402 A | 9/1999 | Baldwin et al. |
| 6,015,350 A | 1/2000 | Breese |
| 6,149,526 A | 11/2000 | Boersma et al. |
| 6,182,427 B1 | 2/2001 | Loehr |
| 6,241,616 B1 | 6/2001 | Lightcap |
| 6,692,365 B2 | 2/2004 | Suzuki et al. |
| 2001/0046902 A1* | 11/2001 | Timmermans et al. ...... 464/162 |

* cited by examiner

*Primary Examiner*—Greg Binda
(74) *Attorney, Agent, or Firm*—Michael G. Harms; John William Stader; Stephen A. Bucchianeri

(57) ABSTRACT

A tubular telescoping drive shaft for transmitting rotation from a rotating power source to an element to be rotated thereby, including at least one inner member or shaft telescopically receivable in an outer tubular shaft and including a universal joint such as a Hooke's joint having pivotal yokes connected with a cross link, all of which are at least substantially received within the outer tubular shaft in a fully retracted position and are rotatably pivotable therein for accommodating misalignment of the rotating power source and element rotated thereby.

4 Claims, 6 Drawing Sheets

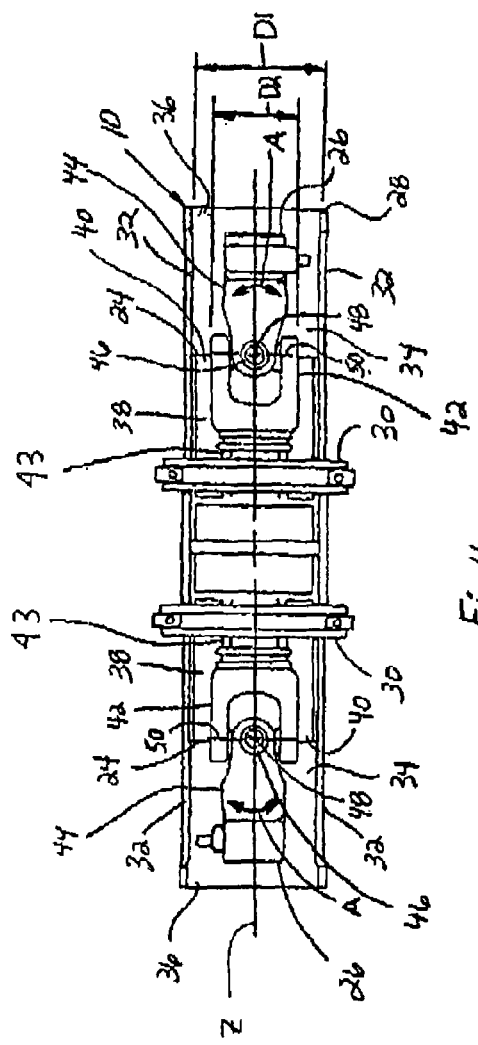
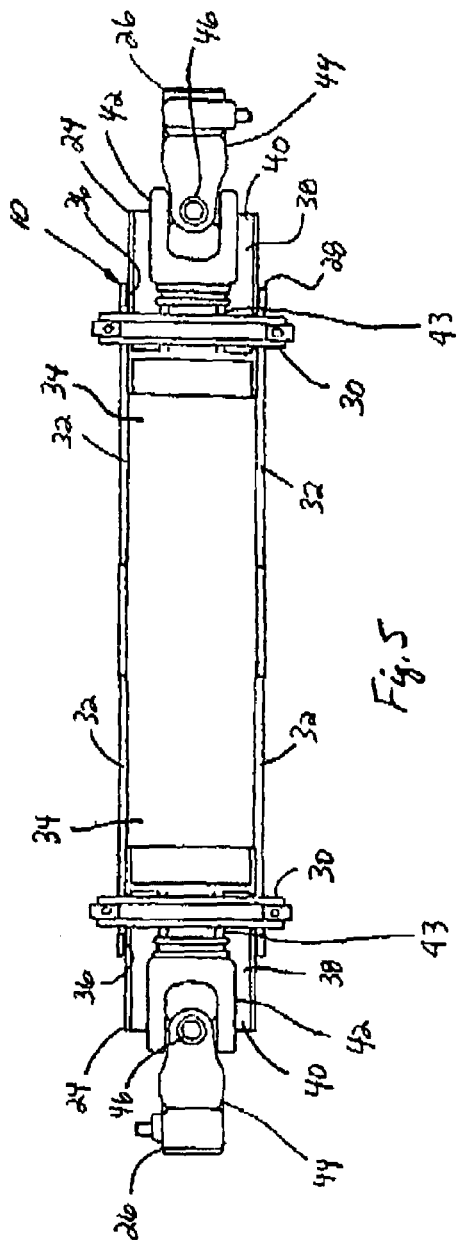
Fig. 4
Fig. 5

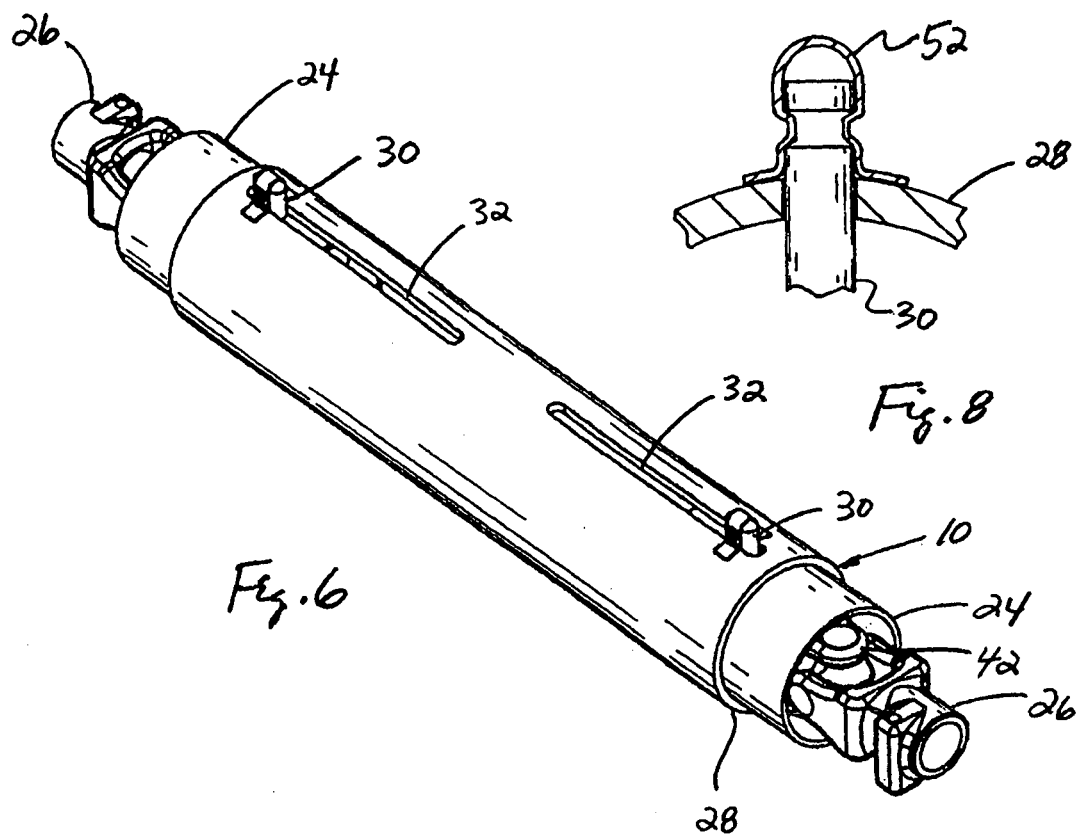
Fig. 8
Fig. 6
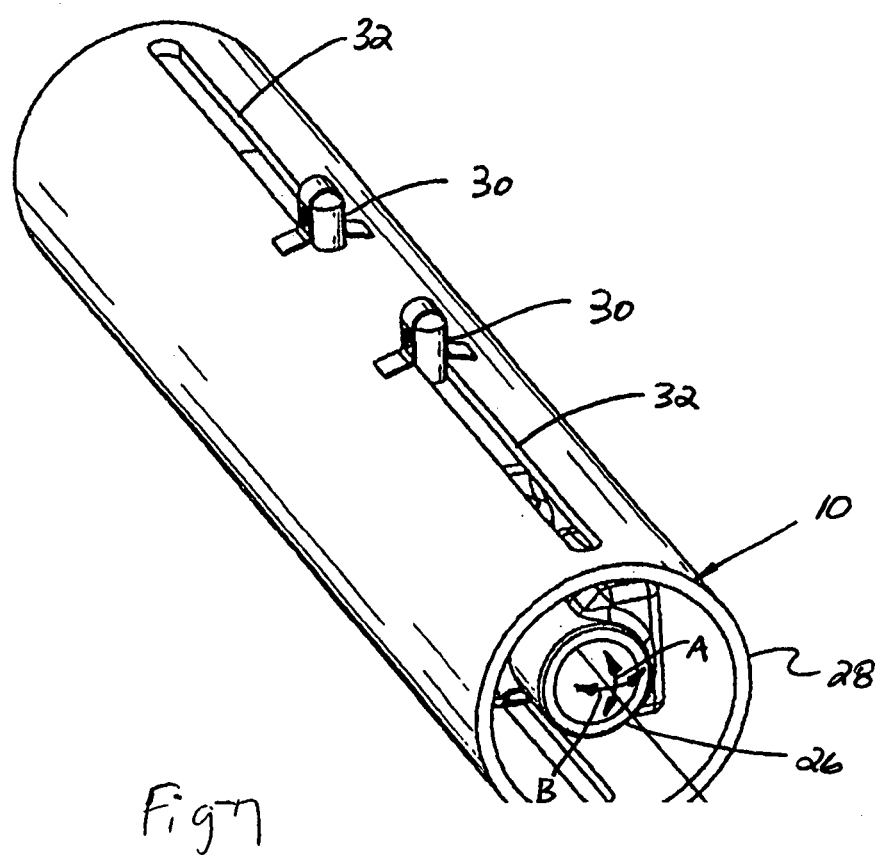
Fig. 7

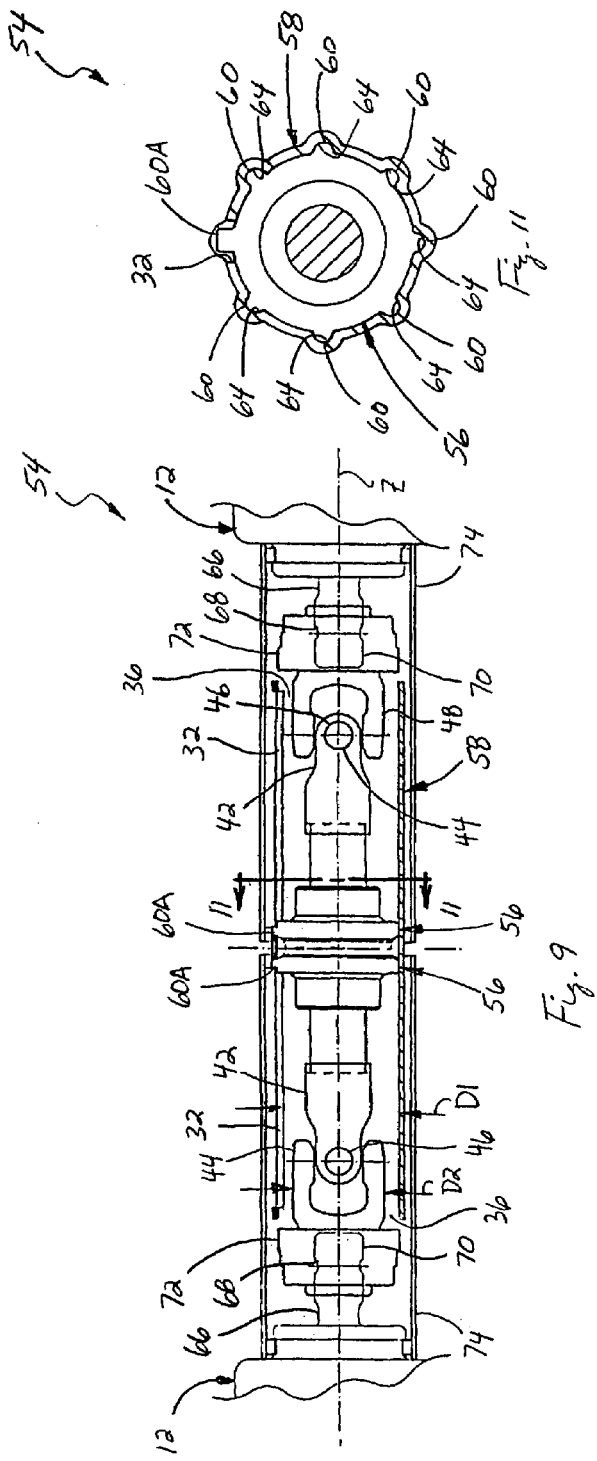

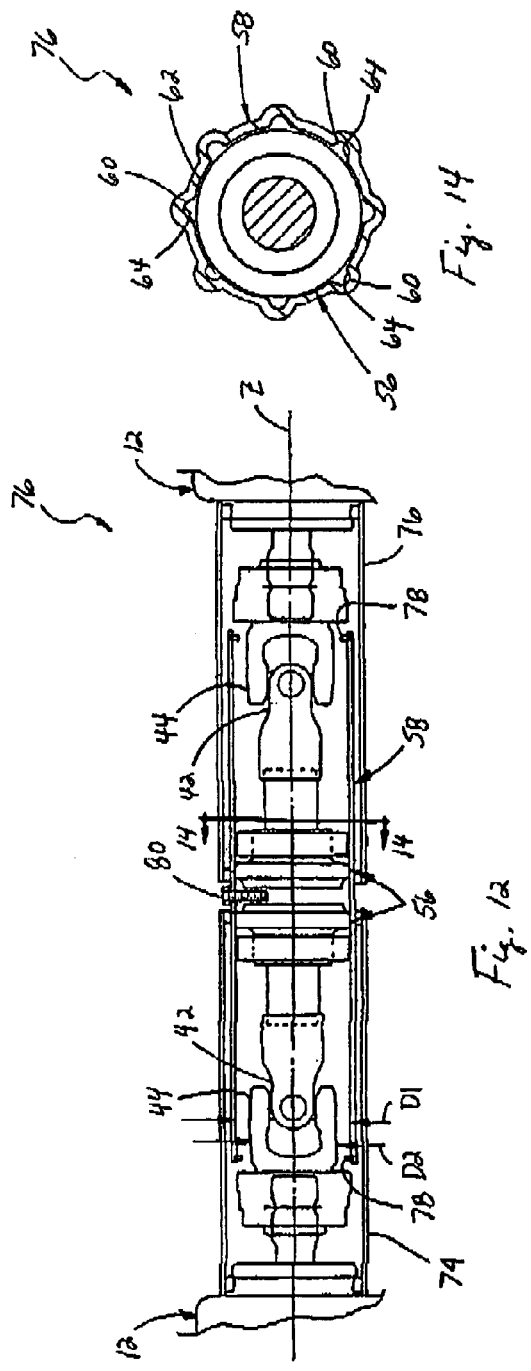

TUBULAR TELESCOPING DRIVE SHAFT

This divisional application claims priority under 35 U.S.C. § 120 from U.S. patent application Ser. No. 10/980,054 filed on Nov. 3, 2004 by J. Bradley Lukac with the same title, now U.S. Pat. No. 7,207,890, the full disclosure of which is hereby incorporated by reference.

TECHNICAL FIELD

This invention relates generally to a drive shaft for transmitting rotation from a rotating power source to an element to be rotated thereby, and more particularly, to a tubular telescoping drive shaft including at least one inner member or shaft telescopically receivable in an outer tubular shaft and including a universal joint such as a Hooke's joint including pivotal yokes connected with a cross link, all of which are received within the outer tubular shaft and rotatably pivotable therein including when the inner member or shaft is in a fully retracted position in the outer tubular shaft.

BACKGROUND ART

Tubular telescoping drive shafts are well known devices for transmitting rotational power between elements which may or may not be perfectly aligned about a rotational axis, and which may, from time to time, be varying distances apart. Such drive shafts often include one or more universal joints, such as a well known Hooke's joint. Reference in this regard, Suzuki et al. U.S. Pat. No. 6,692,365 issued Feb. 17, 2004.

A problem encountered with such known telescoping drive shafts is a lack of a disclosed capability to provide satisfactory function in a substantially fully retracted configuration wherein an inner drive shaft section including a universal joint is completely contained in an outer section and where misalignment is present, and which is also extendable telescopically to a much longer extended configuration.

As an example, modern cotton harvesters typically include a plurality of individual cotton picker row units supported in front of the harvester on a tool bar. Each of the individual row units requires connection to a rotatable power source, such as a transmission connected to an engine of the harvester, a fluid motor, electric motor, or the like. Such individual row units are typically relatively wide, but it is often desired to place adjacent ones of the units relatively close together, for instance, spaced apart on center lines 30 inches or so apart.

However, such row units from time to time require servicing and inspection, which necessitates separating adjacent ones of the units sufficiently to allow an operator to access side panels thereof between the adjacent units, which can entail increasing the spacing between the units, for instance, so as to have as much as about 44 inches between the center lines thereof. As a result, it is required to extend a drive shaft having an initial or retracted length of about 30 inches, to about 44 inches in length, which is about a 50% increase. With past telescoping drive shaft constructions used in this application, this has entailed disassembling components of the drive shaft connected to one of the adjacent row units from components of the shaft connected to the other of the adjacent row units. A resultant problem of this is that the driven row unit is no longer rotatably powered, and if rotation thereof is required for service, the unit must be manually driven, or the drive shaft reconnected which entails bringing the row units closer together, which can decrease access thereto and make servicing more difficult and time consuming. Additionally, an additional person or an alignment tool or support may be required for holding the disassembled components of the drive shaft in alignment for reassembly by the moving together of the adjacent row units.

Thus, what is sought is a tubular telescoping drive shaft which provides the capabilities set forth above and overcomes one or more of the shortcomings and problem of the prior art devices.

SUMMARY OF THE INVENTION

What is disclosed is a tubular telescoping drive shaft which provides one or more of the capabilities set forth above and overcomes one or more of the shortcomings and problems of the prior art devices.

According to a preferred aspect of the invention, the drive shaft includes an inner member having one end including a universal joint having a first yoke mounted to the inner member and pivotally connected to a second yoke by a cross link. The drive shaft includes an elongate tubular outer member having a longitudinal end including a longitudinally facing opening connected with an inner cavity extending longitudinally within the outer member. The inner member is cooperatively received in the inner cavity of the outer member for longitudinal movement therein within a range of longitudinal positions, including a fully retracted position wherein substantially all of the universal joint is located in the cavity, and a fully extended position wherein the inner member is located in the opening such that the universal joint is located longitudinally outwardly of the opening, the inner cavity having a transverse extent sufficiently greater than a transverse extent of the universal joint to allow at least some pivotal movement of the second yoke relative to the first yoke when the second yoke is located in the outer tubular member, including when the inner member is in the fully retracted position. Still further, elements connect the inner and outer members for joint rotation about a central longitudinal axis of rotation therethrough.

As a result, the drive shaft has the ability to transmit rotational power between two elements when misaligned relative to the rotational axis, and to do so when in the fully extended state or condition with the universal joint contained in the outer member, the drive shaft being substantially freely movable between the fully retracted and fully extended positions.

Thus, the drive shaft of the invention is well suited for applications, such as discussed above in relation to the background art, for transmitting rotational power between adjacent row units of a cotton harvester, both when the row units are closely spaced together, and also when spaced a substantial distance apart, for service and the like.

BRIEF DESCRIPTION OF THE DRAWINGS

FIG. 4 is a simplified sectional view of a representative one of the tubular telescoping drive shafts of the invention, shown in a fully retracted state;

FIG. 5 is a simplified sectional view of a representative one of the tubular telescoping drive shafts of the invention, shown in a fully extended state;

FIG. 6 is a perspective view of one of the drive shafts of the invention in the fully extended state;

FIG. 7 is a perspective view of the drive shaft in the fully retracted state;

FIG. 8 is a sectional view showing a drive pin extending through a longitudinal slot in an outer tubular shaft and retained in that position by a retaining spring;

FIG. 9 is a simplified sectional view of an alternative telescoping drive shaft of the invention, shown in a fully retracted state;

FIG. 10 is another simplified sectional view of the drive shaft of FIG. 9, shown in the fully extended state;

FIG. 11 is a sectional view of the drive shaft, taken along line 11-11 of FIG. 9;

FIG. 12 is a simplified sectional view of another alternative telescoping drive shaft of the invention, shown in the fully retracted state;

FIG. 13 is another simplified sectional view of the drive shaft of FIG. 12, shown in the fully extended state; and FIG. 14 is a sectional view of the drive shaft, taken along line 14-14 of FIG. 12.

DETAILED DESCRIPTION OF THE INVENTION

Figure 1:
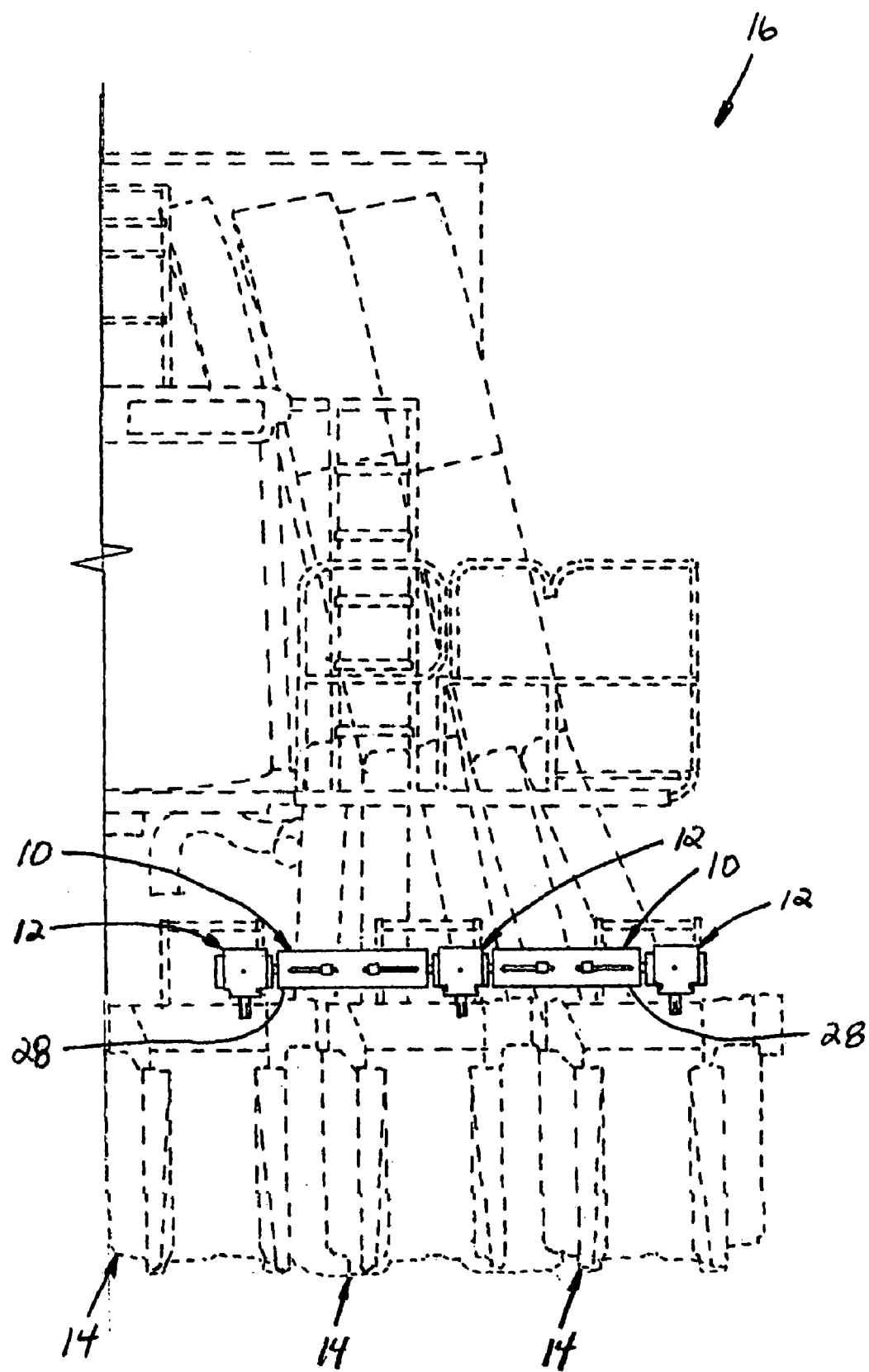
FIG. 1 is a simplified schematic representation of tubular telescoping drive shafts of the invention connecting gear boxes of adjacent harvester row units of a cotton harvester, shown in hidden lines.

Referring now to the drawings, in FIG. 1, representative tubular telescoping drive shafts 10 constructed and operable according to the teachings of the invention, are shown connected between adjacent ones of gear boxes 12 on harvesting row units 14 (shown in hidden lines) of a self-propelled cotton harvester 16 (also shown in hidden lines) of conventional construction and operation.

Figure 2:
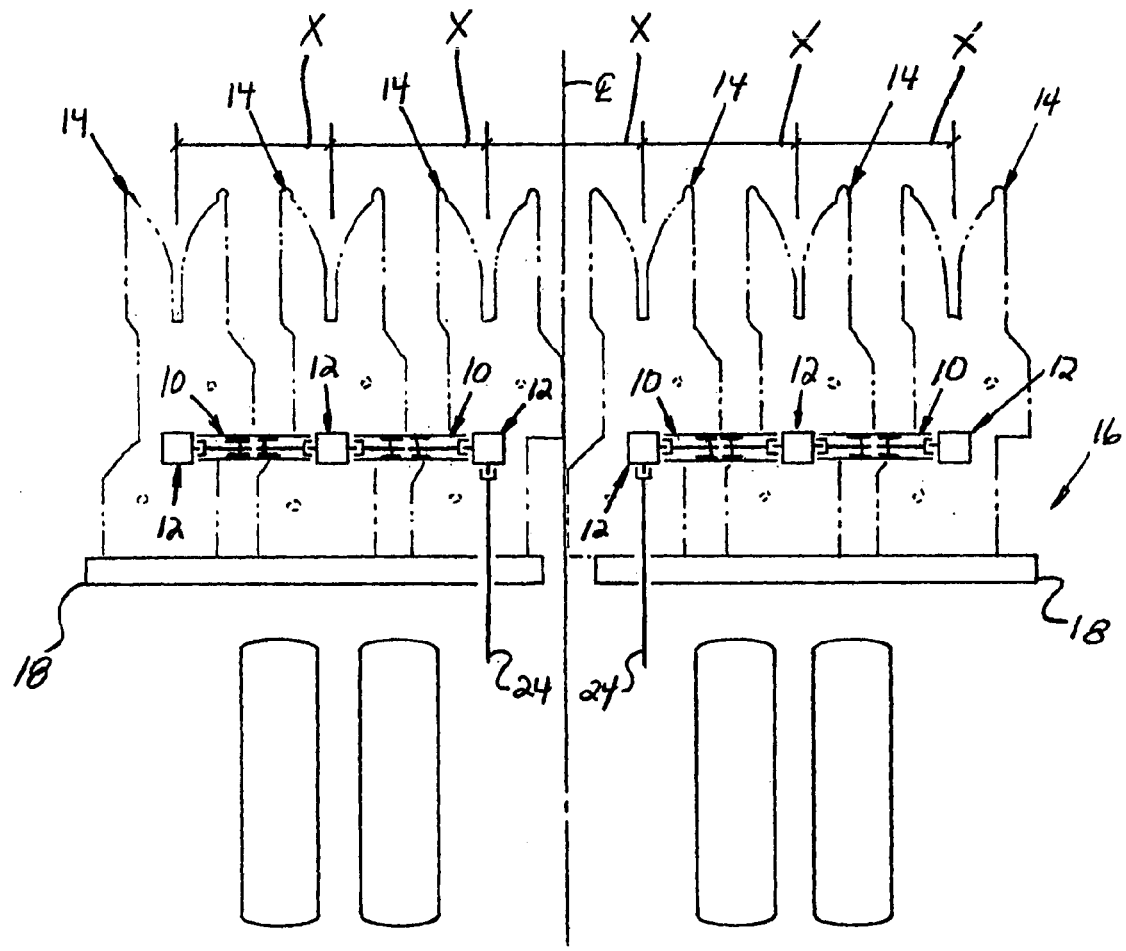
FIG. 2 is a simplified schematic top view of the drive shafts and harvester of FIG. 1.

Referring also to FIG. 2, adjacent ones of row units 14 are shown with center lines thereof spaced a predetermined distance apart, denoted by distance X, which can be, for instance, about 30 inches, for a typical cotton harvesting operation. Row units 14 are supported on one or more tool bars 18 which extend across a front end of harvester 16, in the well known, conventional manner. Row units 14 are typically longitudinally movable along tool bars 18, for setting the distance X between adjacent ones of units 14, and also for separating adjacent ones of units 14 to enlarge a space therebetween, as denoted by distance Y in FIG. 3, for allowing access to internal componentry (not shown) of the individual units 14, typically through side doors and panels, as generally denoted at 20 and 22 in FIG. 3. A representative value for distance Y is about 44 inches.

Figure 3:
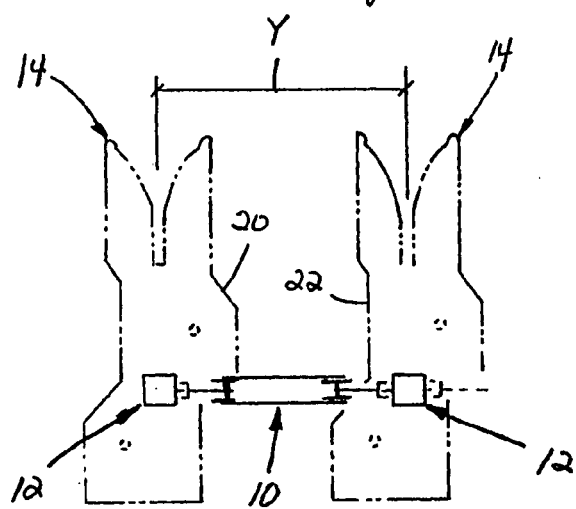
FIG. 3 is another simplified schematic top view of adjacent ones of the harvester row units and a tubular telescoping drive shaft of the invention extending therebetween, with the row units moved apart for servicing and thereby telescopically extending the tubular telescoping drive shaft.

Here, comparing FIGS. 1, 2 and 3, it can be noted that drive shafts 10 each have a retracted state or condition when row units 14 are closely spaced together by the distance X (FIGS. 1 and 2), and a telescopically extended state or condition (FIG. 3). In both states, each drive shaft 10 is drivingly connected between the adjacent ones of gear boxes 12, to provide rotational power transmission therebetween. Each side of harvester 16 includes three row units 14, each including a gear box 12, an inner one of gear boxes 12 on each side of harvester 16 having an input connected in driven relation to a drive shaft 24 (FIG. 2) which in turn is drivingly connected to a source of rotational power, such as a transmission connected to an engine harvester 16, or a fluid or electric motor thereof, in the well known manner (not shown).

Referring also to FIGS. 4, 5, 6 and 7, each drive shaft 10 on the invention preferably includes two inner members 24, each preferably of tubular construction; a pair of universal joints 26, each of which is preferably a Hooke's joint, fixedly connected to one of the inner members; an outer member 28 also of tubular construction, which fully contain inner members 24 and universal joints 26 when drive shaft 10 is in a retracted state or condition (FIGS. 1, 2, 4 and 7). Inner members 24 and universal joints 26 are connected to outer member 28 so as to be jointly rotatable about a common longitudinal rotational axis Z therethrough, by a pin 30 which extends through inner member 24, universal joint 26, and a pair of longitudinal slots 32 through outer member 28.

As noted above, each inner member 24 is preferably a tubular member, preferably of cylindrical section having a predetermined outer diametrical extent. Each outer member 28 is also preferably a tubular member of cylindrical section, having a predetermined inner diametrical extent, which is only marginally larger than the outer diametrical extent of inner member 24, such that inner member 24 is easily slidable longitudinally within longitudinally extending inner cavities 34 of outer member 28 between the positions shown, for example, in FIGS. 4 and 5, which represent a fully retracted position (FIG. 4) and a fully extended position (FIG. 5). Additionally, each inner member 24 preferably has a longitudinal extent sufficient to prevent or limit any significant transverse or sideward rocking or other movements of members 24 within inner cavity portion 34. Outer member 28 additionally includes a pair of longitudinally facing openings 36 connecting with each inner cavity portion 34, to allow extension of inner member 24 longitudinally outwardly therethrough in telescoping relation to outer member 28, as illustrated by the fully extended position in FIG. 5.

Each inner member 24 preferably includes an interior cavity 38 and a longitudinally outwardly facing opening 40 through which the universal joint 26 of the respective inner member 24 extends. Each universal joint 26 includes a first yoke 42 which is fixedly mounted, coaxially with inner and outer members 24 and 28 about axis 7, to a mounting shaft 43 integrally formed with or otherwise fixedly disposed in the axial center of interior cavity 38. Each universal joint 26 additionally includes a second yoke 44 pivotally connected to first yoke 42, by a cross link 46, to allow pivotal movement of second yoke 44, relative to first yoke 42 about a pivotal axis 48 through cross link 46, as denoted by arrows A (FIGS. 4 and 7), and about a second pivotal axis 50 perpendicular to pivotal axis 48 (FIG. 7). Each of the second yokes 44 preferably receives and is connectable to a shaft of a gear box 12 by a conventional, commercially available clamping mechanism, quick release mounting sleeve, or the like, in a well known conventional manner.

Here, it should be observed in FIG. 4 that inner cavity 34 of outer member 28 has a sectional or diametrical extent, denoted by D1, which is sufficiently greater than a maximum sectional extent of universal joint 26, denoted by D2, to allow pivotal movement of second yoke 44 for a particular application, such as to accommodate misalignment of adjacent ones of row units 14 connected by a particular drive shaft 10, when drive shaft 10 is in its fully retracted condition. As noted above, the overall length of a drive shaft 10 in the fully retracted position as shown in FIG. 4 can be as little as 30 inches as required for the present application disposed between adjacent ones of gear boxes 12, or another value, as required for a particular application. In the fully extended position or condition, shown in FIGS. 3, 5 and 6, drive shaft 10 can have a sufficient length, here, about 44 inches, such that second yokes 44 of both universal joints 26 on the opposite ends of the drive shaft remain connected to their respective gear boxes 12, such that rotation of one by the other is still possible, for service, such as for rotating internal componentry of a row unit 14 as required for maintenance or repair.

Referring also to FIG. 8, the opposite ends of each pin 30 are shown including a spring clip 52 clipped thereon and bearing against an outer surface of outer member 28, for applying a resilient biasing force against the pin for centering it relative to axis of rotation Z, and also for retaining the pin in outer member 28.

It should be observed that inner member 24 and outer member 28 are depicted herein as being a smooth walled, cylindrical member. It should be recognized and understood that other cross-sectional shapes could be used, such as, but not limited to, matingly splined or corrugated shapes, as desired or required for joint rotation and other characteristics of a particular application.

In this regard, referring to FIGS. 9, 10 and 11, another embodiment of a tubular telescoping drive shaft 54 constructed and operable according to the teachings of the present invention is shown. Drive shaft 54 is adapted for use as an alternative to drive shaft 10 between gear boxes 12 of cotton harvester 16, in the above-described manner, to provide the same or similar benefits and advantages, like parts of drive shaft 54 and drive shaft 10 being identified by like numbers. Drive shaft 54 preferably includes two inner members 56, each preferably being a double disc shaped member; a pair of universal joints 26, each of which is preferably a Hooke's joint, fixedly connected to one of inner members 56; and an outer member 58 of tubular construction. Outer member 58 includes a longitudinally extending inner cavity 34 and longitudinally facing openings 36 at each end, similarly to outer member 28 of drive shaft 10, which inner cavity 34 fully contains inner members 54 and first and second yokes 42 and 44 and a cross link 46 of universal joints 26 when drive shaft 54 is in a fully retracted state or condition (FIG. 9). Inner members 54 and universal joints 26 are connected to outer member 58 so as to be jointly rotatable about a common longitudinal axis Z therethrough by a plurality of interlocking corrugations 60 at angularly spaced locations around axis Z on an outer circumferential surface 62 of one or both of the disks of inner member 56, which corrugations are matingly received in and slidable along longitudinally extending correspondingly shaped and spaced grooves 64 in an inner circumferential surface of outer member 58. One of the corrugations is denoted as corrugation 60A and extends radially outwardly a greater distance compared to the other corrugations 60, and is cooperatively and slidably received in a longitudinally extending slot 32 through outer member 58. Each of slots 32 terminates in spaced relation to the longitudinal center and to an end of outer member 62, such that corrugation 60A will limit the longitudinal travel of the inner member 56 within outer member 58. Corrugation 60A is preferably connected to inner member 56 so as to be removable therefrom, such as by using one or more pins or fasteners, or it can be a pin or bolt, or it can be otherwise configured, to allow removal of inner member 56 from outer member 58 for disassembly of drive shaft 54. Drive shaft 54 is shown connected between two adjacent ones of gear boxes 12 in a representative manner. Here, each gear box 12 includes a rotatable shaft 66 having an external groove 68 therearound and a circumferential splined section 70, both cooperatively receivable by a suitable connector such as a commercially available quick release mounting sleeve 72 or a clamping mechanism on universal joint 26 for joint rotation, in the conventional, well known manner.

Here, it should be observed that when drive shaft 54 is in its fully retracted position as shown in FIG. 9, all of each of the first yokes 42 and virtually all or all of second yokes 44 of each universal joint 26 are contained in inner cavity 34 of outer member 62. Additionally, here inner members 56 are shown spaced a small axial distance apart, so as to minimize the overall longitudinal length of drive shaft 54 while also minimizing transfer of axial loads through drive shaft 54 between gear boxes 12 connected thereby. Alternatively, inner members 56 can be in axial abutment for some applications, which can contribute to rigidity of the overall structure of drive shaft 54 when in the fully retracted position.

Referring more particularly to FIG. 10, here, it should be noted that drive shaft 54 is fully functional in its fully extended position, for instance, so as to allow one of gear boxes 12 connected thereto to drivingly rotate the other gear box 12 when the row units 14 on which gear boxes 12 are located are in a more widely spread apart service or maintenance position, as generally represented in FIG. 3.

Again, as discussed in more detail above in reference to drive shaft 10, inner cavity 34 of outer member 58 has a sectional or diametrical extent, denoted in FIG. 9 by D1, which is sufficiently greater than a maximum sectional extent of universal joint 26, denoted by D2, to allow pivotal movement of second yoke 44 for a particular application, such as to accommodate misalignment of adjacent ones of row units 14 connected by a particular drive shaft 54, when drive shaft 54 is in any of a range of retracted positions, including its fully retracted condition. Also as noted above in reference to drive shaft 10, the overall length of a drive shaft 10 in the fully retracted position as shown in FIG. 9 can be as little as 30 inches as required for the present application illustrated in FIGS. 1 and 2. In the fully extended position shown in FIG. 10, drive shaft 54 can have a sufficient length, here, about 44 inches, such that second yokes 44 of both universal joints 26 remain connected to their respective gear boxes 12, such that rotation of one by the other is still possible, for service, such as for rotating internal componentry of a row unit 14 as required for maintenance or repair.

Here also, it should be noted that the opposite longitudinal ends of drive shaft 10, including universal joints 26, are covered by protective outer tubular safety guards 74, to prevent accidental entanglement of a person or his or her clothing in a universal joint 26 and to otherwise prevent injury. Each guard 74 is preferably affixed to gear box 12 such that universal joints 26 are covered thereby in any position, and such that outer member 58 is retracted into guards 74 as drive shaft 54 is retracted to a retracted position. Guards, such as guards 74, can likewise be utilized in the same or similar manner in connection with drive shaft 10.

Referring to FIGS. 12, 13 and 14, still another embodiment of a tubular telescoping drive shaft 76 constructed and operable according to the teachings of the present invention is shown. Like draft shafts 10 and 54, drive shaft 76 is adapted for use between gear boxes 12 of cotton harvester 16, in the above-described manner, to provide the same or similar benefits and advantages, like parts of drive shaft 76 and drive shafts 10 and 54 being identified by like numbers. Drive shaft 76, like drive shaft 54, preferably includes two inner members, each preferably being a double disk shaped member; a pair of universal joints 26, each of which is preferably a Hooke's joint, fixedly connected to one of inner members 56; and an outer member 58 of tubular construction. Outer member 58 includes the longitudinally extending inner cavity 34 and longitudinally facing openings 36 at each end, which inner cavity 34 fully contains yokes 42 and 44 of universal joints 26 when drive shaft 76 is in a fully retracted state or condition (FIG. 12). Inner members 54 and universal joints 26 are connected to outer member 58 so as to be jointly rotatable about a common longitudinal axis Z therethrough by a plurality of interlocking corrugations 60 at angularly spaced locations around axis Z on an outer circumferential surface 62 of one of both of the disks of inner member 56, which corrugations are matingly received in and slidable along longitudinally extending correspondingly shaped and spaced grooves 64 in an inner circumferential surface of outer member 58, as illustrated in FIG. 14. Here though, instead of a pin or enlarged corrugation traveling in a longitudinal slot for controlling the length of movement of inner members 56, outer member 58 includes a snap ring 78 disposed in a groove around each of openings 36 engageable with inner member 56 for preventing passage thereof through opening 36, and a spacer 80 which can comprise, for instance, a common fastener, such as a bolt or screw threaded into the side of outer member 58, or a pin, or the like, for maintaining a space between inner members 56 when in the fully retracted position, as shown in FIG. 12, to minimize transfer of axial loads between gear boxes 12 to which drive shaft 76 is connected.

Again, like drive shafts 10 and 54, drive shaft 76 is fully functional through a range of positions including the fully retracted position shown in FIG. 12, and the fully extended position shown in FIG. 13.

Also, as discussed in more detail above, inner cavity 34 of outer member 58 has a sectional or diametrical extent, denoted in FIG. 12 by D1, which is sufficiently greater than a maximum sectional extent of universal joint 26, denoted by D2, to allow pivotal movement of second yoke 44 for a particular application, such as to accommodate misalignment of adjacent ones of row units connected to drive shaft 76, when drive shaft 76 is in any of a range of retracted positions, including the fully retracted position.

Again, tubular safety guard 74 are shown covering universal joints 26, to prevent accidental injury.

As a result of the above discussion, it should be apparent to one skilled in the art that a drive shaft of the present invention, such as drive shaft 10, drive shaft 54 or drive shaft 76, effectively provides a capability for accommodating misalignments between two adjacent members, such as gear box 12 of row units 14 through a range of positions between the fully retracted positions shown in FIGS. 4, 9 and 12, and also fully extended positions as shown in FIGS. 5, 10 and 13. It should also be apparent that drive shafts according to the present invention, as represented by drive shafts 10, 54 and 76, will be smoothly movable between a fully retracted position, and a fully extended position.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A drive shaft comprising:
   an inner member having one end including a universal joint having a first yoke mounted to the inner member and pivotally connected to a second yoke by a cross link;
   an elongate tubular outer member having a longitudinal end including a longitudinally facing opening connected with an inner cavity extending longitudinally within the outer member;
   the inner member being cooperatively received in the inner cavity of the outer member for longitudinal movement therein within a range of longitudinal positions including a fully retracted position wherein substantially all of the universal joint is located in the cavity, and a fully extended position wherein the inner member is located in the opening such that the universal joint is located longitudinally outwardly of the opening, the inner cavity having a transverse extent sufficiently greater than a transverse extent of the universal joint to allow at least some pivotal movement of the second yoke relative to the first yoke when the second yoke is located in the cavity of the outer member including when the inner member is in the fully retracted position;
   elements connecting the inner member and the outer member for joint rotation about a central longitudinal axis therethrough;
   a spacer element extending from the outer member to limit the longitudinal movement of the inner member in the fully retracted position; and
   a snap ring disposed in a groove around the longitudinal facing opening of the outer member, the snap ring engageable with the inner member to prevent passage of the inner member through the opening of the outer member in the fully extended position.

2. The drive shall of claim 1, wherein the first yoke is rigidly connected to the inner member for rotation therewith about the axis, and the second yoke includes an element for connection to another member for rotation with the inner and outer members about the axis.

3. The drive shaft of claim 1, wherein the outer member includes a second longitudinal end including a longitudinally facing second opening connected with the longitudinally extending inner cavity, and a second inner member having one end including a second universal joint including a first yoke pivotally connected to a second yoke, the second inner member being cooperatively received in the inner cavity of the outer member for longitudinal movement within a range of positions including a fully retracted position wherein substantially all of the second universal joint is located in the cavity, and a fully extended position wherein the second inner member is located in the second opening such that the second universal joint is located longitudinally outwardly of the second opening, the transverse extent of the inner cavity being sufficiently greater than a transverse extent of the second universal joint to allow at least some relatively pivotal movement of the second yoke relative to the first yoke when the second yoke is located in the cavity of the outer member including when the second inner member is in the fully retracted position.

4. The drive shaft of claim 1, wherein the inner member is a tubular member including a longitudinally extending interior cavity having a longitudinally facing opening, the first yoke of the universal joint being located at least substantially within the interior cavity.

* * * * *